March 2, 1954   C. J. COVERT ET AL   2,670,696
VACUUM SYSTEM OF MANUFACTURING CHOCOLATE SHELLS
Filed Feb. 2, 1951
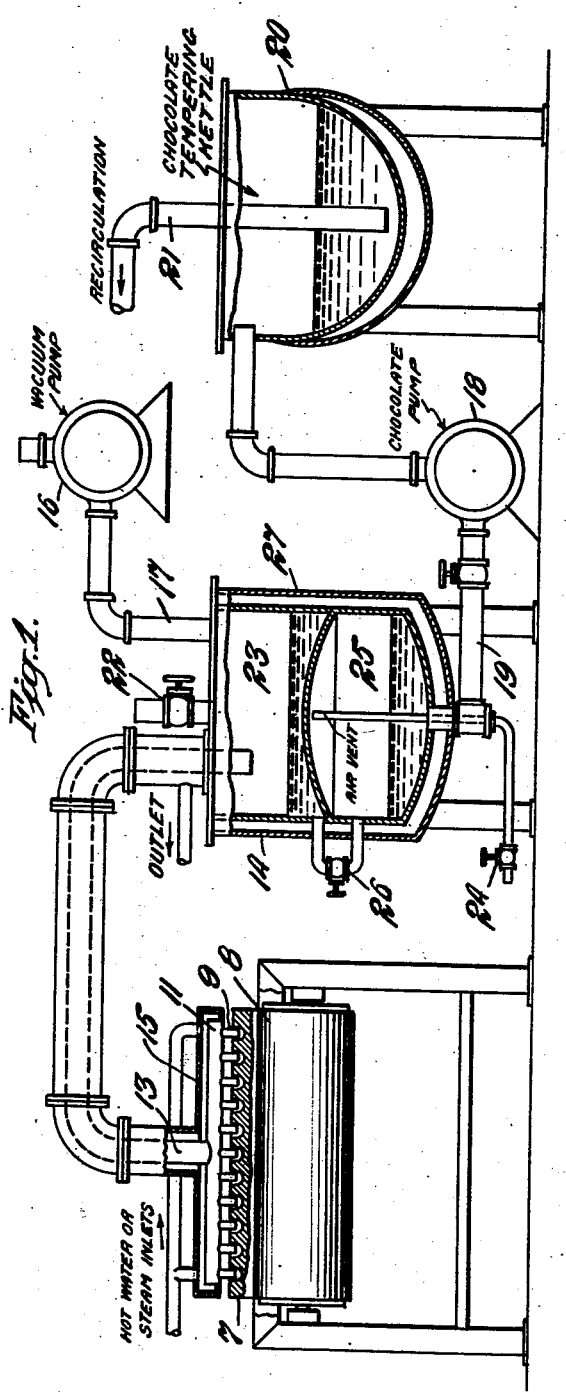
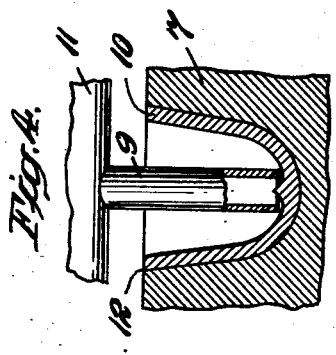
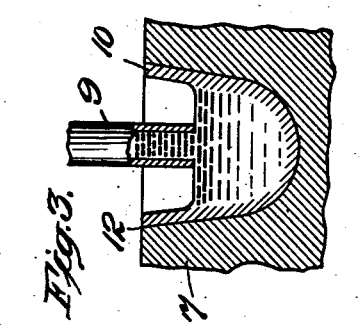
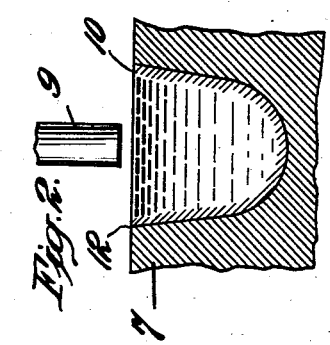
INVENTORS
CLAUDE J. COVERT
BY JOSEPH L. RAFFETTO, JR.
ATTORNEY Patented Mar. 2, 1954

2,670,696

UNITED STATES PATENT OFFICE 2,670,696

VACUUM SYSTEM OF MANUFACTURING CHOCOLATE SHELLS

Claude J. Covert, Glen Rock, and Joseph L. Raffetto, Jr., Ramsey, N. J., assignors to Racine Confectioners' Machinery Co., Racine, Wis., a corporation of Wisconsin Application February 2, 1951, Serial No. 209,068

1 Claim. (Cl. 107—8)

The invention herein disclosed relates to the manufacture of chocolate shells for filled candies.

Objects of the invention are to simplify such manufacture and to eliminate objectionable features experienced under present procedures.

Particularly it is a purpose of the invention to eliminate the need for inverting the molds to pour off excess chocolate and then to scrape the mold faces clear of spilled chocolate.

These objects are accomplished in the present invention through utilization of suction to lift and carry away excess chocolate from the mold cavities.

Other desirable objects attained by this system and the novel features of invention involved therein are set forth or will appear in the course of the following specification.

The drawing accompanying and forming part of the specification illustrates a present commercial embodiment of the invention but structure and arrangement may be modified and changed as regards this illustration, all within the true intent and broad scope of the invention as hereinafter defined and claimed.

Fig. 1 in the drawing is a partly diagrammatic and sectional view of one form of apparatus for carrying out the invention;

Fig. 2 is an enlarged broken sectional showing a filled mold cavity, with the chocolate shell partly congealed and the mouth of the companion suction nozzle about to meet the surface of the liquid chocolate in the center of the mold cavity.

Figs. 3 and 4 are similar views illustrating successive stages of entry of a suction nozzle in the body of chocolate in the mold cavity, the first of these views showing the upper portion of the shell relieved of liquid chocolate and the second showing the nozzle at the lowest point and the shell practically emptied of liquid chocolate.

In the embodiment of the invention illustrated in Fig. 1, multiple cavity molds 7, which have been previously filled in a depositing machine, are carried by a conveyor 8 into position beneath suction nozzles 9 which, either by lifting of the mold or lowering of the nozzles, are caused to enter the mold cavities.

For mechanical reasons it may be simplest to lift the molds to the nozzles, with results approximately as illustrated in Figs. 2, 3 and 4.

The molds may be chilled or tempered so that the chocolate deposited therein in plastic or liquid state will congeal against the mold wall to initiate a shell, approximately as indicated at 10 in Fig. 2.

The suction is on when the nozzle meets the surface of the liquid in the mold cavity so that, as shown in Fig. 3, the liquid is lifted without spilling or other disturbance, leaving the shell in place against the mold wall.

Fig. 4 shows how the nozzle may enter the mold substantially to the bottom of the mold cavity, separated from the mold bottom a distance approximately equal to the desired thickness of the wall of the shell.

This procedure effects a quick, splash-free emptying of the shell, leaving the latter practically dry and free of liquid chocolate, ready to receive the filling material and to be closed, according to usual or possible special filling and closing operations.

The suction nozzles 9 are shown as carried by a suction manifold 11 spaced to register with the cavities 12 in the mold.

The suction pipe 13 extending from the manifold to the suction tank 14 may be suitably steam or water-jacketed, as indicated at 15, to keep the chocolate sufficiently liquid for flow purposes.

A vacuum pump is indicated at 16, suitably connected at 17 with the vacuum tank 14, and a chocolate pump is shown at 18 with a connection at 19 for carrying off the chocolate removed by suction, to the tempering kettle 20 which, through line 21, may supply the depositing machine or machines.

The vacuum tank 14 is shown as having a controllable air vent 22 for the upper chamber 23 and a controllable air vent 24 for the lower chamber 25. An external valved by-pass 26 is shown connecting the upper and lower chambers to transfer chocolate collecting in the upper chamber to the lower chamber, from whence it is removed by the chocolate pump. This tank, like other portions of the apparatus, may be suitably steam or water-jacketed as at 27 to keep the chocolate in proper fluid condition.

The air vent valves at 22 and 24 for the upper and lower chambers 23 and 25, and the valve in the by-pass 26 between these chambers may be regulated as required to enable proper action of the vacuum pump 16, separation and removal of air from the upper chamber 23 and flow of the chocolate from the upper chamber down into the lower chamber and to the chocolate pump 18.

The wall thickness, strength and other characteristics of the shells may be governed by control of mold temperature, time and other related factors, including suction, volume and pressure conditions.

With suction on as the nozzles approach the mold cavities, the liquid, free of the congealing wall forming layer, will be sucked up and withdrawn, this action continuing progressively as the nozzles lower down toward the bottom of the mold cavities. In this manner free liquid is drawn toward the center of the mold cavity, away from the surrounding face surface of the mold, to keep the top surface clear and free of any excess material.

With the elimination of any need for turning the molds over or scraping them, the action may be relatively rapid and continuous, resulting in a high rate of production and a uniform, high grade product.

With the savings in time accomplished by the more nearly continuous operation, expenses and labor costs are reduced.

Details of the conveyor for carrying the molds to the suction nozzles and the means for lifting the molds up to and over the mouths of the nozzles are not shown, since such constructions may vary within wide limits. Actually this may be a chain conveyor construction with plungers positioned and timed to lift and lower the molds at the station where the suction nozzles are located.

What is claimed is:

Apparatus for the manufacture of chocolate shells comprising in combination with open top, multiple cavity molds conditioned to congeal molten chocolate deposited therein, into chocolate shells containing liquid chocolate, a stationary suction manifold, suction nozzles dependent from said manifold in position to register with the mold cavities, conveyor means for carrying said molds to the suction manifold and for effecting relative lifting of the mold cavities up over the ends of the nozzles, a stationary suction tank, a vacuum pump connected with said suction tank, a suction pipe extending from the suction manifold to said suction tank, heat supplying means connected with said suction manifold, suction pipe and suction tank for keeping the chocolate extracted by the nozzles in liquid state, and means in the suction tank for effecting separation of liquid chocolate from air withdrawn by the vacuum pump, including upper and lower chambers in said tank, a valved by-pass between said chambers, valved vents for said upper and lower chambers, said vacuum pump being connected with said upper chamber, and a chocolate removing pump connected with said lower chamber.

CLAUDE J. COVERT.
JOSEPH L. RAFFETTO, Jr.

References Cited in the file of this patent
UNITED STATES PATENTS

| Number | Name | Date |
|---|---|---|
| 1,462,883 | Cloud | July 24, 1923 |
| 1,932,931 | Greer et al. | Oct. 31, 1933 |
| 1,973,778 | Price | Sept. 18, 1934 |
| 2,023,741 | Moir | Dec. 10, 1935 |
| 2,101,240 | Cloud | Dec. 7, 1937 |
| 2,212,863 | Hughes | Aug. 27, 1940 |